United States Patent
Deng et al.

(10) Patent No.: US 7,269,489 B2
(45) Date of Patent: Sep. 11, 2007

(54) ADAPTIVE REAR-WHEEL STEER OPEN-LOOP CONTROL FOR VEHICLE-TRAILER SYSTEM

(75) Inventors: Weiwen Deng, Rochester Hills, MI (US); Yong H. Lee, Troy, MI (US); Ming Tian, West Chester, OH (US)

(73) Assignee: General Motors Corporation, Detroit, MI (US)

( * ) Notice: Subject to any disclaimer, the term of this patent is extended or adjusted under 35 U.S.C. 154(b) by 335 days.

(21) Appl. No.: 11/106,102

(22) Filed: Apr. 14, 2005

(65) Prior Publication Data

US 2006/0235589 A1    Oct. 19, 2006

(51) Int. Cl.
B62D 13/00    (2006.01)
(52) U.S. Cl. .................. 701/41; 280/400; 180/418
(58) Field of Classification Search ............ 701/41–43; 280/400, 419, 426, 442; 180/418–420, 443–446
See application file for complete search history.

(56) References Cited

U.S. PATENT DOCUMENTS

| | | | |
|---|---|---|---|
| 6,292,094 B1* | 9/2001 | Deng et al. ................. | 340/431 |
| 6,580,988 B2 | 6/2003 | Lin et al. | |
| 6,854,557 B1* | 2/2005 | Deng et al. ................. | 180/445 |
| 7,154,385 B2* | 12/2006 | Lee et al. ................... | 340/431 |
| 2004/0002800 A1 | 1/2004 | Grougan et al. | |
| 2005/0206224 A1* | 9/2005 | Lu ............................... | 303/7 |
| 2005/0206229 A1* | 9/2005 | Lu et al. ..................... | 303/123 |
| 2005/0206233 A1* | 9/2005 | Offerle et al. .............. | 303/146 |
| 2006/0229782 A1* | 10/2006 | Deng et al. ................. | 701/42 |

* cited by examiner

Primary Examiner—Gary Chin

(57) ABSTRACT

A rear-wheel steering control system for a vehicle/trailer combination that adaptively changes an open-loop feed-forward command signal for different trailers or the same trailer with different configurations based only on vehicle parameters. The system includes a hand-wheel sensor for providing a hand-wheel angle signal of a hand-wheel position of the vehicle, a vehicle speed sensor for providing a vehicle speed signal of the vehicle, and a vehicle yaw rate sensor for providing a measured vehicle yaw rate signal of the vehicle. The system also determines if a vehicle yaw rate has reached a steady state and uses the steady-state yaw rate signal to calculate the rear-wheel steering command. In one embodiment, the system updates feed-forward rear/front values for a plurality of predetermined vehicle speeds when determining the proper rear-wheel steering command.

20 Claims, 4 Drawing Sheets

ADAPTIVE REAR-WHEEL STEER OPEN-LOOP CONTROL FOR VEHICLE-TRAILER SYSTEM

BACKGROUND OF THE INVENTION

1. Field of the Invention

This invention relates generally to open-loop feed-forward rear-wheel steering control in a vehicle/trailer combination and, more particularly, to an adaptive open-loop feed-forward rear-wheel steering control in a vehicle/trailer combination, where the open-loop control is adapted for different trailers or the same trailer with different configurations, such as load and load distribution, based only on vehicle parameters.

2. Discussion of the Related Art

It is known in the art to employ automatic rear-wheel vehicle steering based on vehicle dynamic information during a vehicle turn, or yaw. Active rear-wheel steering control can improve vehicle stability over a conventional vehicle having only two steerable front wheels. The rear-wheel steering control can be in-phase steering or out-of-phase steering. In-phase rear-wheel steering steers the rear wheels in the same direction as the front wheels, and is typically provided at higher vehicle speeds. Out-of-phase rear-wheel steering steers the rear wheels in an opposite direction as the front wheels to provide a tighter turning radius, and is typically provided at lower vehicle speeds.

Open-loop rear-wheel steering control provides a certain amount of steering control depending on the amount of front-wheel steering provided by the vehicle operator and the vehicle speed. It is known to provide closed-loop rear-wheel steering based on certain feedback signals in the event that the vehicle is not following the steering path requested by the vehicle operator. Closed-loop rear-wheel steering control systems sense the actual vehicle yaw rate and the intended yaw rate, and generate an error signal that provides the steering assist by the rear wheels if the vehicle yaw rate and the intended yaw rate are not the same.

Known open-loop feed-forward control systems for vehicle/trailer combinations are based on nominal or known trailer parameters. Because trailers come in different sizes, weights, types, etc., a rear-wheel steering control for a vehicle/trailer combination could benefit by considering the particular trailer parameters to increase vehicle/trailer handling and performance.

SUMMARY OF THE INVENTION

In accordance with the teachings of the present invention, a rear-wheel steering control system for a vehicle/trailer combination is disclosed that adaptively changes an open-loop feed-forward command signal for different trailers or the same trailer with different configurations, such as load and load distribution, based only on vehicle parameters. The system includes a hand-wheel sensor for providing a hand-wheel angle signal of a vehicle hand-wheel position, a vehicle speed sensor for providing a vehicle speed signal of the speed of the vehicle, and a vehicle yaw rate sensor for providing a measured vehicle yaw rate signal of the yaw rate of vehicle. The system also determines if the vehicle yaw rate has reached its steady state based on the yaw rate signal to determine the command signal. In one embodiment, the system adapts and stores an updated feed-forward rear/front (R/F) ratio for a plurality of predetermined vehicle speeds for the trailer based on the vehicle parameters where the feed-forward rear/front (R/F) ratio values provide the rear-wheel steering command signal.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to an adaptive rear-wheel steering control system is merely exemplary in nature, and is in no way intended to limit the invention or its applications or uses.

Figure 1:
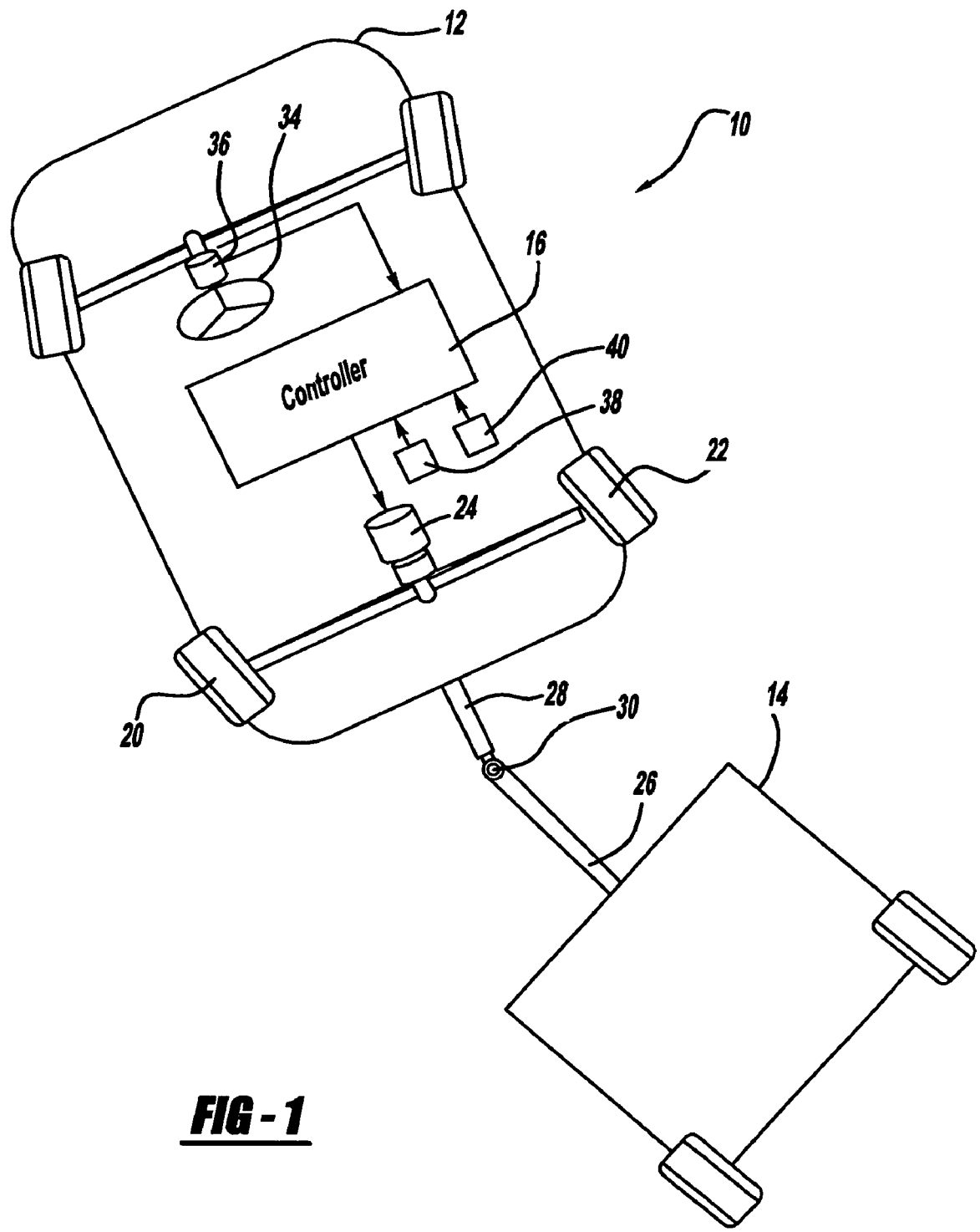
FIG. 1 is a plan view of a vehicle/trailer combination including a controller for providing a rear-wheel steering control of the vehicle.

FIG. 1 is a plan view of a vehicle/trailer combination 10 including a vehicle 12 and a trailer 14. The vehicle 12 includes a controller 16 that provides an automatic rear-wheel steering control signal to rear wheels 20 and 22 through an electric motor 24. The trailer 14 includes a trailer hitch post 26 and the vehicle 12 includes a vehicle hitch post 28 including a hitch 30. The vehicle 12 includes a hand-wheel 34 and a hand-wheel position sensor 36 for measuring the angle of the hand-wheel 34 and providing a hand-wheel angle signal to the controller 16. The vehicle 12 further includes a vehicle speed sensor 38 for providing a vehicle speed signal to the controller 16 of the speed of the vehicle 12 and a vehicle yaw rate sensor 40 for providing a vehicle yaw rate signal to the controller 16 of the yaw rate of the vehicle 12. The sensors referred to above can be any sensor suitable for the purposes discussed herein.

As will be discussed in detail below, the controller 16 provides an open-loop feed-forward rear-wheel steering control signal based only on vehicle parameters to provide the optimum open-loop control for different trailers.

Figure 2:
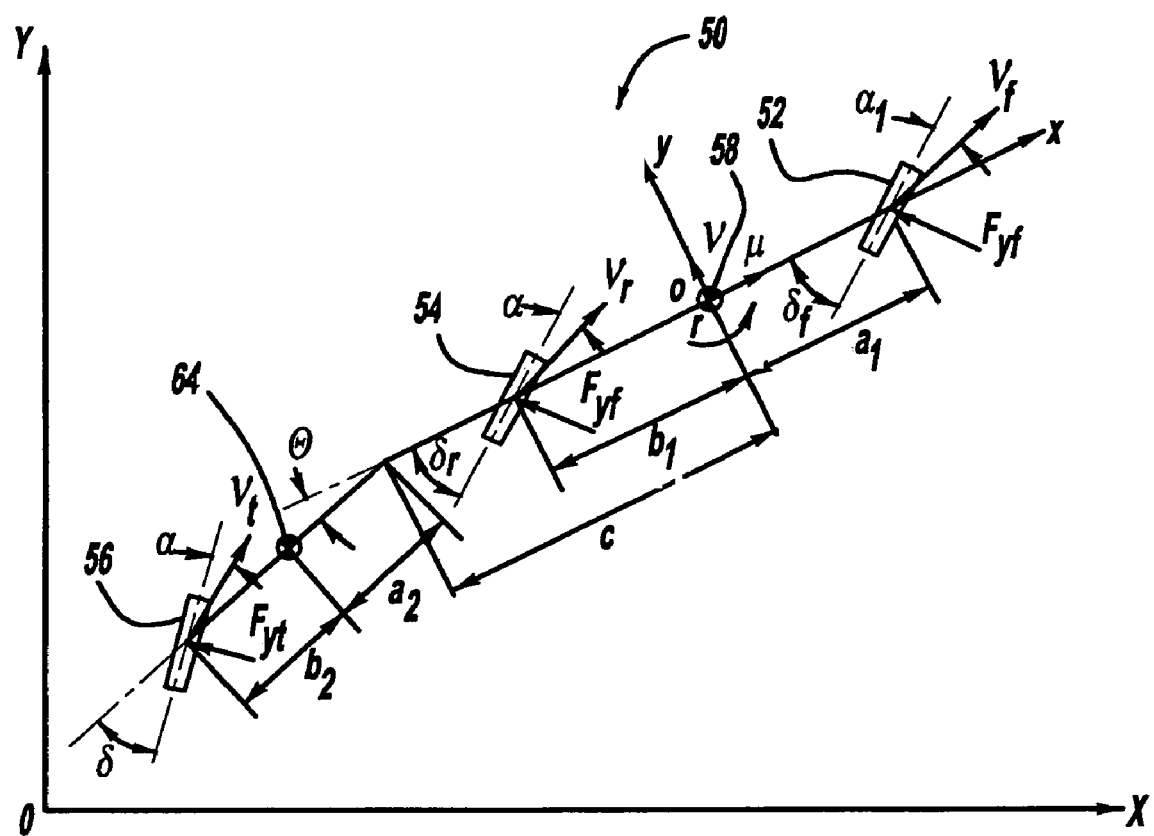
FIG. 2 is a tricycle model of the vehicle/trailer combination.

To calculate the open-loop feed-forward control signal referred to above, the vehicle/trailer combination 10 is modeled as a tricycle model 50 shown in FIG. 2, where wheel 52 represents the front wheels of the vehicle 12, wheel 54 represents the rear wheels 20 and 22 of the vehicle 12, wheel 56 represents the wheels of the trailer 14, point 58 is the center of gravity of the vehicle 12 and point 64 is the center of gravity of the trailer 14. The following nomenclature is used in the tricycle model 50 and the equations below.

$m_1$: mass of the vehicle 12;
$m_2$: mass of the trailer 14;
$I_{z1}$: yaw moment of inertia of the vehicle 12;
$I_{z2}$: yaw moment of inertia of the trailer 14;
$a_1$: distance from the center of gravity to the front axle of the vehicle 12;

$b_1$: distance from the center of gravity to the rear axle of the vehicle 12;

c: distance from the center of gravity of the vehicle 12 to the hitch point;

$a_2$: distance from the center of gravity of the trailer 14 to the hitch point;

$b_2$: distance from the center of gravity of the trailer 14 to the trailer axle;

$C_f$: concerning stiffness of the front wheels of the vehicle 12;

$C_r$: concerning stiffness of the rear wheels 20 and 22 of the vehicle 12;

$C_t$: concerning stiffness of the trailer wheels;

u: forward velocity of the vehicle 12;

v: side-slip velocity of the vehicle 12;

r: yaw rate of the vehicle 12;

θ: hitch angle;

$δ_{sw}$: hand-wheel angle of the vehicle 12;

$δ_f$: steering angle of the front wheels of the vehicle 12;

$δ_r$: steering angle of the rear wheels of the vehicle 12; and $δ_t$: steering angle of the wheels of the trailer 14.

Based on the tricycle model 50, a model equation in linear form can be written as:

$$\begin{bmatrix} m_1+m_2 & -m_2(c+a_2) & -m_2 a_2 & 0 \\ m_1 c & I_{z1} & 0 & 0 \\ -m_2 a_2 & I_{z2}+m_2 a_2^2 + m_2 c a_2 & I_{z2}+m_2 a_2^2 & 0 \\ 0 & 0 & 0 & 1 \end{bmatrix} \begin{bmatrix} \dot{v} \\ \dot{r} \\ \dot{\phi} \\ \dot{\theta} \end{bmatrix} = \quad (1)$$

$$\frac{1}{u}\begin{bmatrix} -(C_f+C_r+C_1) & -a_1 C_f + b_1 C_r + (c+a_2+b_2)C_t - (m_1+m_2)u^2 & (a_2+b_2)C_t & C_t \\ -(a_1+c)C_f + (b_1-c)C_r & -a_1(a_1+c)C_f + b_1(c-b_1)C_r - m_1 c u^2 & 0 & 0 \\ (a_2+b_2)C_t & -(a_2+b_2)(c+a_2+b_2)C_t + m_2 a_2 u^2 & -(a_2+b_2)^2 C_t & -(a_2+b_2)C_t \\ 0 & 0 & u & 0 \end{bmatrix}$$

$$\begin{bmatrix} v \\ r \\ \phi \\ \theta \end{bmatrix} + \begin{bmatrix} C_f & C_r \\ (a_1+c)C_f & (c-b_1)C_r \\ 0 & 0 \\ 0 & 0 \end{bmatrix} \begin{bmatrix} \delta_f \\ \delta_{r\_ff} \end{bmatrix}$$

Where $δ_{r\_cmd}$ is the rear-wheel steering command signal for the open-loop control.

Equation (1) can be simplified as:

$$M\dot{X} = A_0 \cdot X + [B_{01} \quad B_{02}] \cdot \begin{bmatrix} \delta_f \\ \delta_{r\_ff} \end{bmatrix} \quad (2)$$

Equation (2) can be written in space form as:

$$\dot{X} = A \cdot X + B_1 \delta_f + B_2 \delta_{r\_ff} \quad (3)$$

With the open-loop command signal $δ_{r\_ff} = K_f(u)δ_f$, the state-space equation can be written as:

$$\dot{X} = A \cdot X + (B_1 + B_2 K_f) \cdot \delta + E \cdot \delta_{r\_fb} \quad (4)$$
$$= A \cdot X + B \cdot \delta_f + E \cdot \delta_{r\_fb}$$

The open-loop feed-forward rear/front (R/F) ratio $K_f(u)$ is determined based on various criteria, such as zero lateral speed at the vehicle's center of gravity or the hitch 30. In this invention, a zero lateral speed at the hitch 30 is used to determine the feed-forward rear/front (R/F) ratio $K_f(u)$. This kinematically minimizes the coupling between the vehicle 12 and the trailer 14, and thus minimizes the adverse lateral motion influence between the vehicle 12 and the trailer 14.

The lateral velocity at the hitch 30 is given as:

$$v_{yh} = v - rc \quad (5)$$

The feed-forward R/F ratio $K_f(u)$ can be determined by letting $\dot{X}=0$ and $v_{yh}=0$. From equation (4):

$$K_f(u) = \frac{-C_f(a_1+c)u^2 m_2 b_2 - }{C_r(c-b_1)u^2 m_2 b_2 - } \quad (6)$$
$$\frac{C_f(m_1 a_1 u^2 + ca_1 C_r + cb_1 C_r - b_1^2 C_r)(a_2+b_2)}{C_r(m_1 b_1 u^2 + ca_1 C_f + cb_1 C_f + a_1 b_1 C_f + a_1^2 C_f)(a_2+b_2)}$$

From equation (6), all of the vehicle parameters are known and the trailer parameters $m_2 b_2$ and $(a_2+b_2)$ are unknown. Further, from equation (1), with $\dot{X}=0$, the steady-state vehicle yaw rate $r_{ss}$ can be calculated as:

$$r_{ss} = \frac{C_f C_r u(a_1+b)(a_2+b_2)(\delta_f - \delta_{r\_cmd})}{[C_f(a_1+c_1) + C_r(c-b_1)]u^2 m_2 b_2 +} \quad (7)$$
$$[m_1(a_1+C_f - b_1 C_r)u^2 - 2a_1 b_1 C_f C_r - (a_1^2+b_1^2)C_f C_r](a_2+b_2)$$

Rewriting equation (7) to solve for $m_2 b_2$ gives:

$$m_2 b_2 = \frac{C_f C_r u(a_1+b_1)(\delta_f \delta_{r\_cmd}) -}{[Cf(a_1+c) + C_r(c-b_1)]u^2 r_{ss}} \quad (8)$$
$$\frac{[m_1(a_1 C_f - b_1 C_r)u^2 - 2a_1 b_1 C_f C_r - (a_1^2+b_1^2)C_f C_f]r_{ss}}{}$$
$$(a_2+b_2)$$
$$= G(\delta_f, \delta_{r\_cmd}, r_{ss}) \cdot (a_2+b_2)$$

Replacing $m_2b_2$ with equation (7) in equation (5), the R/F ratio $K_f(u)$ can be obtained as:

$$K_f(u) = \frac{-C_f(a_1+c)u^2 G(\delta_f, \delta_{r\_cmd}, r_{ss}) - C_f(m_1 a_1 u^2 + ca_1 C_r + cb_1 C_r - a_1 b_1 C_r - b_1^2 C_r)}{C_r(c-b_1)u^2 G(\delta_f, \delta_{r\_cmd}, r_{ss}) - C_r(m_1 b_1 u^2 + ca_1 C_f + cb_1 C_f + a_1 b_1 C_f + a_1^2 C_f)} \quad (9)$$

Because the vehicle yaw rate signal $r(t_n)$ from the sensor 42 is known, equation (9) does not depend on the trailer parameters. Therefore, equation (9) can be used to provide an adaptive open-loop control based only on the vehicle parameters. Equation (9) can be rewritten as:

$$K_f(u)=f(\delta_f \mu, r_{ss}, \delta_{r\_cmd})|\Gamma v \quad (10)$$

Where $\Gamma v$ represents the vehicle parameters only, $\delta_f, u, r_{ss}$ are available from the sensors, and $\delta_{r\_cmd}$ is the rear-wheel steering command angle.

Figure 3:
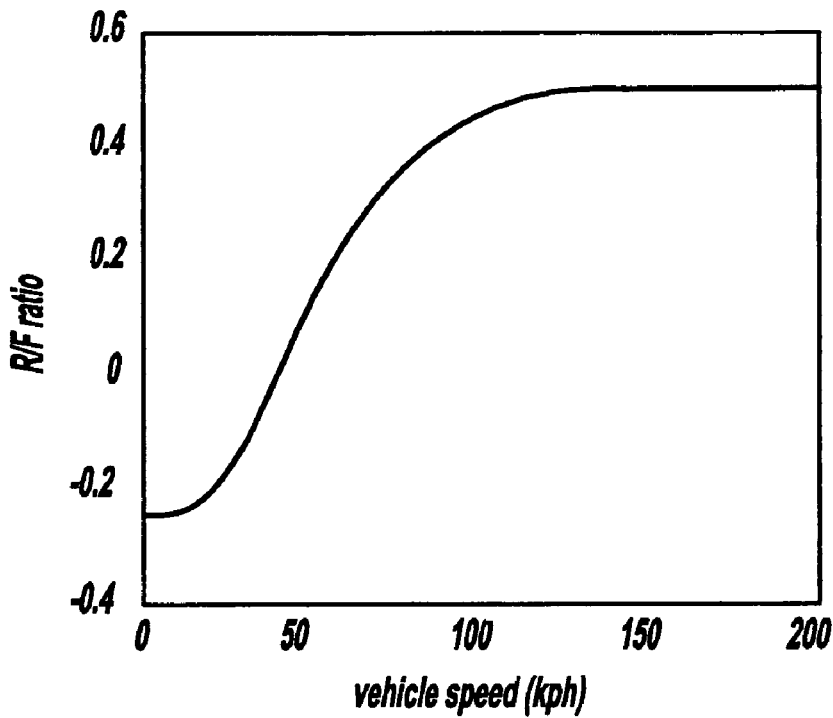
FIG. 3 is a graph with vehicle speed on the horizontal axis and steering command ratio R/F on the vertical axis showing representative steering command values for an open-loop feed-forward steering control signal based on vehicle speed.

FIG. 3 is a graph with vehicle speed on the horizontal axis and the open-loop feed-forward R/F ratio $K_f(u)$ on the vertical axis showing a typical or nominal look-up table that provides the R/F ratio for various vehicle speeds. In one embodiment, a few R/F ratio values are determined for a few vehicle speeds, and the rest of the graph is then interpolated.

Figure 4:
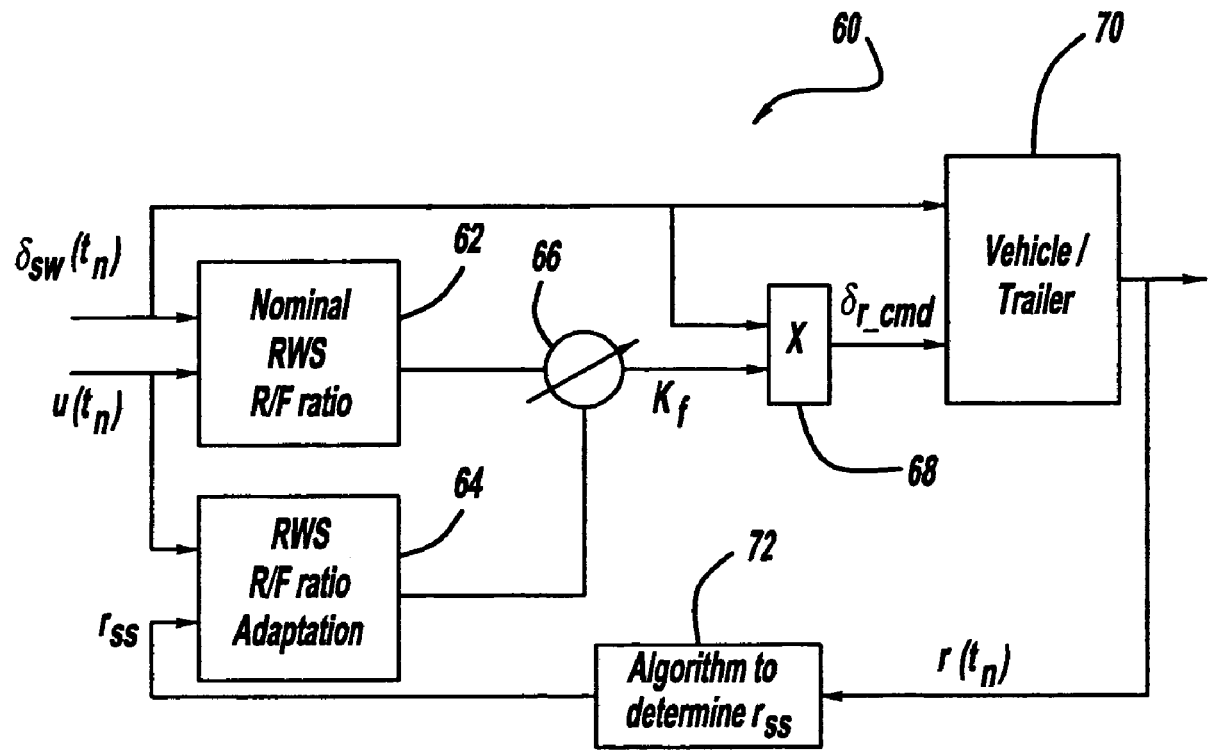
FIG. 4 is a block diagram of a control system for providing a rear-wheel open-loop feed-forward steering command signal, according to an embodiment of the present invention.

FIG. 4 is a block diagram of a control system 60 showing details of how the controller 16 calculates the rear-wheel steering signal by adapting the open-loop command look-up table for different trailers using only vehicle parameters, as discussed above. In one embodiment, each discreet vehicle speed value in the look-up table is adapted for a particular trailer, and the rest of the graph is interpolated. The overall vehicle control system can cause the system 60 to begin a new adaptation process each time a trailer is connected to the hitch 30. A sensor can be used to detect the trailer being connected to the hitch 30, or the vehicle operator can switch a switch (not shown) to begin the adaptation process for a new trailer. For each discreet vehicle speed, the vehicle must be making a steady-state turn or yaw for that speed for the adaptation process to occur.

The system 60 includes a nominal rear-wheel steering (RWS) R/F ratio process block 62 that is responsive to the hand-wheel angle signal $\delta_{sw}(t_n)$ and the vehicle speed signal $u(t_n)$. The process block 62 employs a nominal or previously adapted R/F ratio look-up table, such as the one shown in FIG. 3. The system 60 also includes an RWS R/F ratio adaptation process block 64 that receives the vehicle speed signal $u(t_n)$ and the vehicle steady-state yaw rate $r_{ss}$. The process block 64 generates new R/F ratio values to update any R/F ratio look-up table calculated from equation (9). The R/F ratio values from the process blocks 62 and 64 are sent to an adapter 66 that updates the R/F ratio value $K_f$. The updated ratio value $K_f$ and the hand-wheel angle signal $\delta_{sw}(t_n)$ are multiplied together in a multiplier 68 to generate the rear-wheel steering command signal $\delta_{r\_cmd}$. The hand-wheel angle signal $\delta_{sw}(t_n)$ and the steering command signal $\delta_{r\_cmd}$ are sent to a vehicle/trailer combination 70. The vehicle yaw rate signal $r(t_n)$ from the yaw rate sensor 42 is sent to an algorithm process block 72 that determines if it has reached the steady-state vehicle yaw rate $r_{ss}$ from equation (7). In this manner, the open-loop feed-forward steering command signal is updated for different trailers or the same trailer with different configurations using only the vehicle parameters discussed above.

Figure 5:
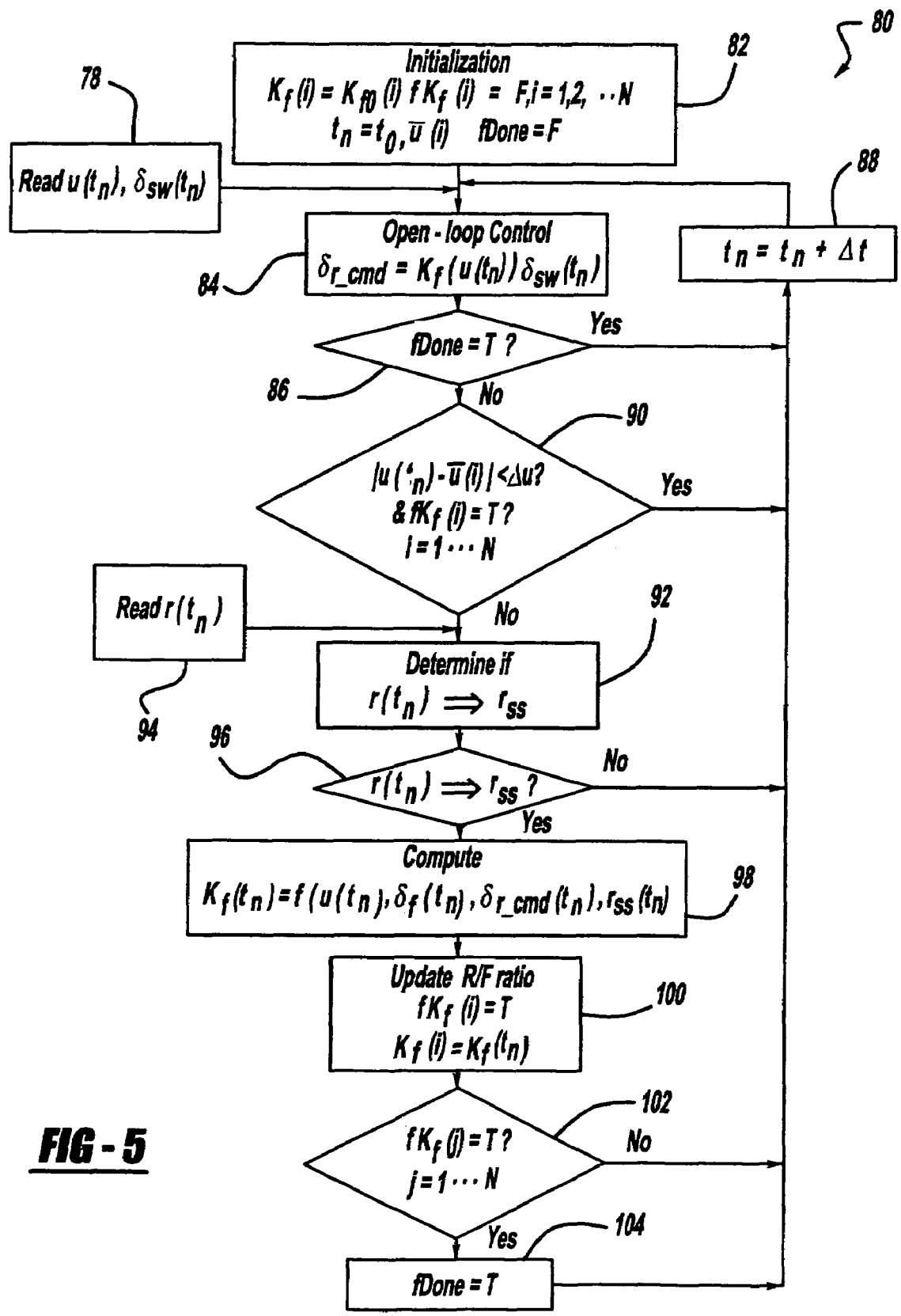
FIG. 5 is a flow chart diagram showing one operation for the algorithm used in the control system shown in FIG. 4.

FIG. 5 is a flow chart diagram 80 showing the operation of an algorithm for the control system 60, according to one embodiment of the invention. The algorithm is initialized at box 82. The R/F ratio $K_f(i)$ is a function of the vehicle speed, which is put into discreet numbers to be a vector as $\bar{u}(i)$, i=1,2, ..., N. In other words, the R/F ratio look-up table is defined by several vehicle speeds, such as 0, 20, 40, 60, 80 kph, that are each adapted to the trailer being towed. Further, corresponding to each speed value $\bar{u}(i)$, a boolean variable flag $fK_f(i)$ is set to false, where i=1,2, ... N. A false flag for a particular speed value $\bar{u}(i)$ indicates that the corresponding R/F ratio value $K_f(i)$ has not been updated yet. Also, a boolean variable flag fDone is set false, indicating that the R/F ratio updating for each speed value $\bar{u}(i)$ has not yet been completed. Initially, the R/F ratio value $K_f(i)$ corresponding to each speed value $\bar{u}(i)$ is assigned a nominal value $K_{f0}(i)$, for example, a value obtained from a typical R/F ratio curve like the one depicted in FIG. 3. Also, a timer is initialized as $t_n=t_0$.

The sensor information of the vehicle speed signal $u(t_n)$ and the hand-wheel angle signal $\delta_{sw}(t_n)$ are read at box 78, and the open-loop control for the steering command signal $\delta_{r\_cmd}$ based on the initially assigned R/F ratio value $K_{f0}(i)$ is performed at box 84. This causes the rear-wheel steering command signal $\delta_{r\_cmd}$ to be multiplied by the initial R/F ratio $K_{f0}(i)$ and the hand-wheel angle signal $\delta_{sw}(t_n)$. The algorithm then determines whether the flag fDone is false to determine if the R/F ratio update has been completed for all of the speed values $\bar{u}(i)$ at decision diamond 86. If all of the R/F ratio values $K_f(i)$ have been updated at the decision diamond 86, the algorithm sets $t_n=t_n+\Delta t$ at box 88, and returns to reading the vehicle speed signal $u(t)$ and the hand-wheel angle signal $\delta_{sw}(t_n)$ at box 78.

If the flag fDone is still false at the decision diamond 86, then the algorithm determines if the current vehicle speed signal $u(t_n)$ falls into one of the predetermined speed vector values $\bar{u}(i)$ at decision diamond 90. The algorithm also determines if the flag $fK_f(i)$ is set true for that speed value $\bar{u}(i)$ at the decision diamond 90. If the vehicle speed signal $u(t)$ does fall into one of the speed vector position and the flag $fK_f(i)$ is true for that speed value $\bar{u}(i)$, the algorithm determines that the ratio $K_f(i)$ for that vehicle speed $u(t_n)$ has already been updated, and returns to the box 88 to update the timer.

If the R/F ratio value $K_f(i)$ for the current vehicle speed has not been updated at the decision diamond 90, then the vehicle yaw rate $r(t_n)$ is read at box 94 to determined if it has reached the vehicle yaw rate steady-state value $r_{ss}$ at box 92 and decision diamond 96. This is accomplished by observing the yaw rate signal $r(t_n)$ for a predefined period of time to determine if its variation range remains small. If the vehicle yaw rate signal $r(t_n)$ is at the steady-state value $r_{ss}$ at the decision diamond 96, then the algorithm computes the R/F ratio $K_f(t_n)$ by equations (8) and (9) at box 98.

The algorithm then updates the R/F ratio value $K_f(i)=K_f(t_n)$ for that vehicle speed $\bar{u}(i)$, and sets the RF ratio flag $fK_f(i)$ to true for that vehicle speed $\bar{u}(i)$ at box 100. The algorithm then determines if all of the $fK_f(i)$ flags are set to true at decision diamond 102. If all of the flags $fK_f(i)$ are true, then the flag fDone is set to true at box 104. Otherwise, the algorithm returns to box 88 to update the timer.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control system for providing an open-loop rear-wheel steering assist signal for a vehicle/trailer combination, said system comprising:
   a hand-wheel angle sensor for providing a hand-wheel angle signal of the position of a vehicle hand-wheel;
   a vehicle speed sensor for providing a vehicle speed signal of the speed of the vehicle;
   a vehicle yaw rate sensor for providing a measured vehicle yaw rate signal of the yaw rate of the vehicle; and
   a controller responsive to the hand-wheel angle signal, the vehicle speed signal and the vehicle yaw rate signal, said controller generating the open-loop steering assist signal, said controller adapting the open-loop steering assist signal for different trailers or the same trailer with different configurations based only on vehicle parameters and without any trailer parameters.

2. The system according to claim 1 wherein the controller calculates a vehicle steady-state yaw rate value used for adapting the rear-wheel steering assist signal based on the yaw rate signal.

3. The system according to claim 2 wherein the controller includes a rear-wheel steering processor responsive to the vehicle speed signal and the hand-wheel angle signal, said rear-wheel steering processor generating nominal rear-wheel steering values, said controller further including a rear-wheel adapter processor responsive to the vehicle speed signal and the vehicle steady-state yaw rate value, said rear-wheel adapter processor generating new feed-forward rear/front (R/F) ratio values for rear-wheel steering control.

4. The system according to claim 3 wherein the controller further includes an adapter for updating the new feed-forward rear/front (R/F) ratio values for the rear-wheel steering control.

5. The system according to claim 4 wherein the controller further includes a multiplier for multiplying the updated feed-forward rear/front (R/F) values and the hand-wheel angle signal and generating a rear-wheel steering command signal that provides the rear-wheel steering assist signal.

6. The system according to claim 1 wherein the controller adapts and stores new feed-forward rear/front (R/F) ratio value for a plurality of predetermined vehicle speeds for the trailer based on the vehicle parameters where the rear-wheel steering values provide the steering assist signal.

7. The system according to claim 1 wherein the vehicle parameters include the mass of the vehicle, the distance from the center of gravity of the vehicle to a front axle of the vehicle, the distance from the center of gravity of the vehicle to a rear axle of the vehicle, a corning stiffness of front wheels of the vehicle and a corning stiffness of rear wheels of the vehicle.

8. The system according to claim 7 wherein the controller calculates the open-loop steering signal with the equation:

$$K_f(u) = \frac{-C_f(a_1+c)u^2 G(\delta_f, \delta_{r\_cmd}, r_{ss}) - C_f(m_1 a_1 u^2 + ca_1 C_r + cb_1 C_r - a_1 b_1 C_r - b_1^2 C_r)}{C_r(c-b_1)u^2 G(\delta_f, \delta_{r\_cmd}, r_{ss}) - C_r(m_1 b_1 u^2 + ca_1 C_f + cb_1 C_f + a_1 b_1 C_f + a_1^2 C_f)}$$

where $K_f(u)$ is a steering ratio value, $C_f$ is the cornering stiffness of the front wheels of the vehicle, a is the distance from the center of gravity to the front axle of the vehicle, c is the distance from the center of gravity of the vehicle to a hitch point between the vehicle and the trailer, u is the vehicle speed signal, G is a function, $\delta_f$ is a front-wheel steer angle of the vehicle signal, $\delta_{r\_cmd}$ is a rear-wheel steering command signal, $r_{ss}$ is a vehicle steady-state yaw rate signal, m is the mass of the vehicle, $C_r$ is the cornering stiffness of the rear wheels of the vehicle, and b is the distance from the center of gravity of the vehicle to the rear axle of the vehicle.

9. A control system for providing an open-loop rear-wheel steering assist signal for a vehicle/trailer combination, said system comprising:
   a hand-wheel angle sensor for providing a hand-wheel angle signal of the hand-wheel position of a vehicle hand-wheel;
   a vehicle speed sensor for providing a vehicle speed signal of the speed of the vehicle;
   a vehicle yaw rate sensor for providing a measured vehicle yaw rate signal of the yaw rate of the vehicle;
   a steady-state processor responsive to the vehicle yaw rate signal, said steady state processor determining if the vehicle yaw rate signal has reached steady state and generating a vehicle yaw rate steady-state signal;
   a rear-wheel steering processor responsive to the vehicle speed signal and the hand-wheel angle signal, said rear-wheel steering processor generating nominal rear-wheel steering values;
   a rear-wheel adapter processor responsive to the vehicle speed signal and the vehicle steady-state signal, said rear-wheel adapter processor generating new feed-forward rear/front (R/F) ratio values;
   an adapter for updating the nominal rear-wheel steering values with the new feed-forward rear/front (R/F) ratio values; and
   a multiplier for multiplying the updated feed-forward rear/front (R/F) ratio values and the hand-wheel angle signal and generating a rear-wheel steering command signal that provides the rear-wheel steering assist signal.

10. The system according to claim 9 wherein the system adapts and stores the new feed-forward rear/front (R/F) ratio values for a plurality of predetermined vehicle speeds for the trailer based only on the vehicle parameters.

11. The system according to claim 10 wherein the vehicle parameters include the mass of the vehicle, the distance from the center of gravity of the vehicle to a front axle of the vehicle, the distance from the center of gravity of the vehicle to a rear axle of the vehicle, a corning stiffness of front wheels of the vehicle and a corning stiffness of rear wheels of the vehicle.

12. The system according to claim 11 wherein the controller calculates the open-loop steering signal with the equation:

$$K_f(u) = \frac{-C_f(a_1+c)u^2 G(\delta_f, \delta_{r\_cmd}, r_{ss}) - C_f(m_1 a_1 u^2 + ca_1 C_r + cb_1 C_r - a_1 b_1 C_r - b_1^2 C_r)}{C_r(c-b_1)u^2 G(\delta_f, \delta_{r\_cmd}, r_{ss}) - C_r(m_1 b_1 u^2 + ca_1 C_f + cb_1 C_f + a_1 b_1 C_f + a_1^2 C_f)}$$

where $K_f(u)$ is a steering ratio value, $C_f$ the cornering stiffness of the front wheels of the vehicle, a is the distance from the center of gravity to the front axle of the vehicle, c is the distance from the center of gravity of the vehicle to a hitch point between the vehicle and the trailer, u is the vehicle speed signal, G is a function, $\delta_f$ is a front-wheel steer angle of the vehicle signal, $\delta_{r\_cmd}$ is a rear-wheel steering command signal, $r_{ss}$ is a vehicle steady-state yaw rate signal, m is the mass of the vehicle, $C_r$ is the cornering stiffness of the rear wheels of the vehicle, and b is the distance from the center of gravity of the vehicle to the rear axle of the vehicle.

13. A method for providing an open-loop rear-wheel steering assist signal for a vehicle/trailer combination, said method comprising:
providing a hand-wheel angle signal of the position of a vehicle hand-wheel;
providing a vehicle speed signal of the speed of the vehicle;
providing a measured vehicle yaw rate signal of the yaw rate of the vehicle; and
adapting the open-loop steering signal for different trailers or the same trailer with different configurations using only vehicle parameters and without any trailer parameters by using the hand-wheel angle signal, the vehicle speed signal and the vehicle yaw rate signal.

14. The method according to claim 13 wherein adapting the open-loop steering signal includes using a vehicle steady-state yaw rate value based on the yaw rate signal.

15. The method according to claim 13 wherein adapting the open-loop steering signal includes generating nominal rear-wheel steering values and new feed-forward rear/front (R/F) ratio values.

16. The method according to claim 15 wherein adapting the open-loop steering signal includes updating the nominal rear-wheel steering values and with the new feed-forward rear/front (R/F) ratio values and generating adapted rear-wheel steering command values.

17. The method according to claim 16 wherein adapting the open-loop steering signal includes multiplying the updated new feed-forward rear/front (R/F) ratio values and the hand-wheel angle signal, and generating a rear-wheel steering command signal that provides the rear-wheel steering assist signal.

18. The method according to claim 13 wherein adapting the open-loop steering signal includes adapting and storing feed-forward rear/front (R/F) values for a plurality of pre-determined vehicle speeds based on the vehicle parameters.

19. The method according to claim 13 wherein the vehicle parameters include the mass of the vehicle, the distance from the center of gravity of the vehicle to a front axle of the vehicle, the distance from the center of gravity of the vehicle to a rear axle of the vehicle, a corning stiffness of front wheels of the vehicle and a corning stiffness of rear wheels of the vehicle.

20. The method according to claim 19 wherein adapting the open-loop steering signal includes calculating the open-loop steering signal with the equation:

$$K_f(u) = \frac{-C_f(a_1+c)u^2 G(\delta_f, \delta_{r\_cmd}, r_{ss}) - C_f(m_1 a_1 u^2 + ca_1 C_r + cb_1 C_r - a_1 b_1 C_r - b_1^2 C_r)}{C_r(c-b_1)u^2 G(\delta_f, \delta_{r\_cmd}, r_{ss}) - C_r(m_1 b_1 u^2 + ca_1 C_f + cb_1 C_f + a_1 b_1 C_f + a_1^2 C_f)}$$

where $K_f(u)$ is a steering ratio value, $C_f$ is the cornering stiffness of the front wheels of the vehicle, a is the distance from the center of gravity to the front axle of the vehicle, c is the distance from the center of gravity of the vehicle to a hitch point between the vehicle and the trailer, u is the vehicle speed signal, G is a function, $\delta_f$ is a front-wheel steer angle of the vehicle, $\delta_{r\_cmd}$ is a rear-wheel steering command signal, $r_{ss}$ is a vehicle steady-state yaw rate signal, m is the mass of the vehicle, $C_r$ is the cornering stiffness of the rear wheels of the vehicle, and b is the distance from the center of gravity, of the vehicle to the rear axle of the vehicle.

* * * * *